United States Patent [19]

Jungmeister

[11] 4,402,084
[45] Aug. 30, 1983

[54] REGENERATOR HAVING A CODE RULE VIOLATION CHECKING DEVICE

[75] Inventor: Hans G. Jungmeister, Munich, Fed. Rep. of Germany

[73] Assignee: Siemens Aktiengesellschaft, Berlin & Munich, Fed. Rep. of Germany

[21] Appl. No.: 284,987

[22] Filed: Jul. 20, 1981

[30] Foreign Application Priority Data

Jul. 22, 1980 [DE] Fed. Rep. of Germany ....... 3027733
Feb. 12, 1981 [DE] Fed. Rep. of Germany ....... 3105120

[51] Int. Cl.³ .......................................... H04L 25/66
[52] U.S. Cl. ...................................... 375/4; 375/110; 371/57
[58] Field of Search ............... 375/4, 86, 110; 371/55, 371/56, 57; 340/347 DD; 307/238.6, 260, 268, 272 A, 272 R, 273; 328/164; 360/34, 45, 53

[56] References Cited

U.S. PATENT DOCUMENTS 3,986,053 10/1976 Döemer .............................. 307/268
4,071,692 1/1978 Weir et al. ......................... 375/110
4,075,569 2/1978 Wright ................................ 328/164
4,227,251 10/1980 Kazama et al. ......................... 375/4
4,337,457 6/1982 Tache .................................. 371/56

Primary Examiner—Benedict V. Safourek
Assistant Examiner—Stephen Chin
Attorney, Agent, or Firm—Hill, Van Santen, Steadman & Simpson

[57] ABSTRACT

For operational monitoring in PCM links, when a redundant code is used, the possibility is employed of establishing faults by violations of the code rule. In the recoding of the transmission signals in intermediate regenerators of the transmission link, it is necessary to provide a code rule violation checking device for each individual regenerator, which results in an increase in the expense in the regenerators. The code rule violation checking device disclosed is included in the pulse regenerator so that only one additional RS flip-flop, two time delay elements and two gate arrangements are necessary for this purpose. The invention may be employed in PCM links having transmission signals represented in the AMI code and, in particular, in transmission links employing element speeds of a few hundred Mbit/s.

8 Claims, 4 Drawing Figures

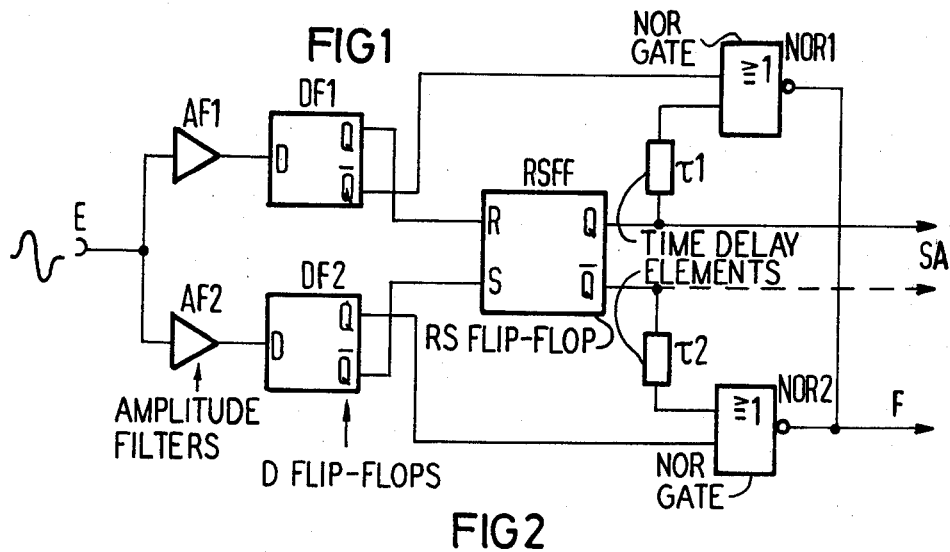
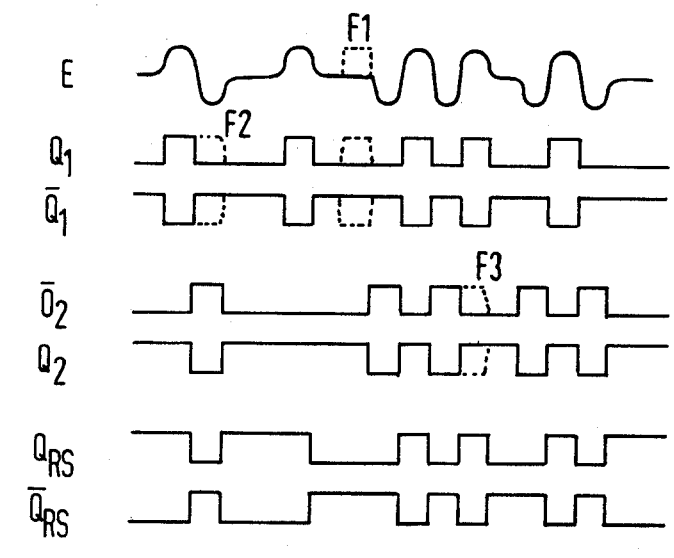

4,402,084

REGENERATOR HAVING A CODE RULE VIOLATION CHECKING DEVICE

BACKGROUND OF THE INVENTION

1. Field of the Invention

The present invention relates to a regenerator for PCM signals represented in the AMI code with a time decision device having two clocked D flip-flops, at the output of which two separate unipolar pulse trains can be obtained which are regenerated with respect to amplitude and time, and having a code rule violation checking device.

2. Description of the Prior Art

The combination of a plurality of digitized speech signals and/or data signals to form a t.d.m. signal and the combination of a plurality of such t.d.m. signals finally results, across a plurality of hierarchy stages, in t.d.m. signals having bit rates which amount to a few hundred Mbit/s. Such t.d.m. signals are transmitted as pseudo-ternary digital signals across copper cables because of the freedom of the transmission signal from d.c., where the use of the AMI code frequently involves advantages. The AMI code is a pseudo-ternary code in which binary "0" digits are transmitted as zero elements and binary "1" digits are transmitted alternately as positive and negative signals having a logic "1" level, where the plurality of the consecutive "1" pulses in each case changes.

Within the transmission link, pulse regenerators are inserted at specific intervals in the cable link and in these regenerators the transmission signal is regenerated in respect of amplitude and time. During regeneration, because of the absence of a ternary logic, a first unipolar pulse train is produced from the positive "1" signals of the transmission signal and a second unipolar pulse train is produced from the negative "1" signals and the two pulse trains are regenerated separately in respect of amplitude and time. Then, it is possible to combine the unipolar pulse trains to form a new tranmission signal represented in the AMI code, and in the case of the end regenerator a different signal processing unit can be connected.

In accordance with the German published application No. 24 07 954, it is also possible to carry out the amplitude decision making process in comparators which are followed by the D flip-flops as time decision devices. Another possibility of making a direct decision as regards the bipolar AMI signal is that the D flip-flops—possibly preceded by amplitude filters—are matched to the signal level merely by a d.c. voltage level shift as regards the position of their thresholds. In this case, separate unipolar pulse trains occur at flip-flop outputs, which pulse trains must subsequently be combined.

As regards a simple possibility of producing an AMI signal by means of a quarter-wave tap line short-circuited at the end, it is desirable to convert the unipolar pulse trains into a signal represented in the binary-difference code in the regenerator. The code rule for this code consists in that a logic "1" in the binary input signal is marked as a change in the logic level from zero to one or from one to zero in the binary-difference code, whereas the logic "0" in the binary input signal is marked as the retention of the logic level one or zero from the previous bit in the binary-difference code.

The operational monitoring of such digital transmission systems with transmission signals represented in the AMI code employs the redundancy of this code which possesses three digital values, two of which, however, are used for the same state of the original signal for the information transmission. Employing the special property of the AMI code that consecutive one pules must always occur with a different polarity, by means of a code rule violation checking device it is possible to monitor the transmission signal even following scrambling with pseudo-random sequence. However, because of the conversion of the transmission signal in each individual intermediate regenerator, a code rule violation checking process is required in each individual intermediate regenerator.

SUMMARY OF THE INVENTION

The object of the present invention, therefore, is to provide a regenerator which requires the lowest possible expense for PCM signals represented in the AMI code, which regenerator contains a code rule violation checking device and produces regenerated signals in the binary-difference code.

In accordance with the present invention, the above object is achieved in that for the code rule violation checking there is additionally provided an RS flip-flop whose reset input and whose set input are each separately connected to an output of the clocked D flip-flops, that the outputs of the RS flip-flop represent the push-pull signal output for the regenerated signal, where a unipolar pulse train containing the entire information can be obtained from each output terminal. Two gate arrangements each having two inputs are provided. One input of the first gate arrangement is connected to the non-inverting output of the RS flip-flop, whereas the other input of the first gate arrangement is connected to an output of that D flip-flop to which the reset input of the RS flip-flop is connected. One input of the second gate arrangement is connected to the inverting output of the RS flip-flop, whereas the other input of the second gate arrangement is connected to an output of that clocked D flip-flop to which the set input of the RS flip-flop is connected. The outputs of the gate arrangements are connected to one another and to an output for providing an error indication signal.

With respect to the setting of determinate signal transit times to the inputs of the gate arrangements, a further development of the invention is advantageous when a time delay element is connected to each of the connections from the outputs of the RS flip-flop to the inputs of the gate arrangements, and the pulse transit time through the RS flip-flop and a connected time delay element corresponds to a total of one bit duration.

When the regenerator is constructed in the ECL technique, a further development of the invention is advantageous in which the gate arrangements comprise a first NOR gate and a second NOR gate. The first input of the first NOR gate is connected to the output for the inverse signals of the first D flip-flop. The first input of the second NOR gate is connected to the non-inverting output of the second D flip-flop. The reset input of the RS flip-flop is connected to the non-inverting output of the first D flip-flop and the set input of the RS flip-flop is connected to the inverting output of the second D flip-flop. The second input of the first NOR gate is connected by way of a time delay element to the non-inverting output of the RS flip-flop, and the second input of the second NOR gate is connected by way of a second time delay element to the inverting output of the RS flip-flop.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic circuit representation of a regenerator constructed in accordance with the present invention;

FIG. 2 is a pulse diagram relating to the regenerator illustrated in FIG. 1;

DESCRIPTION OF THE PREFERRED EMBODIMENTS

Figure 3:
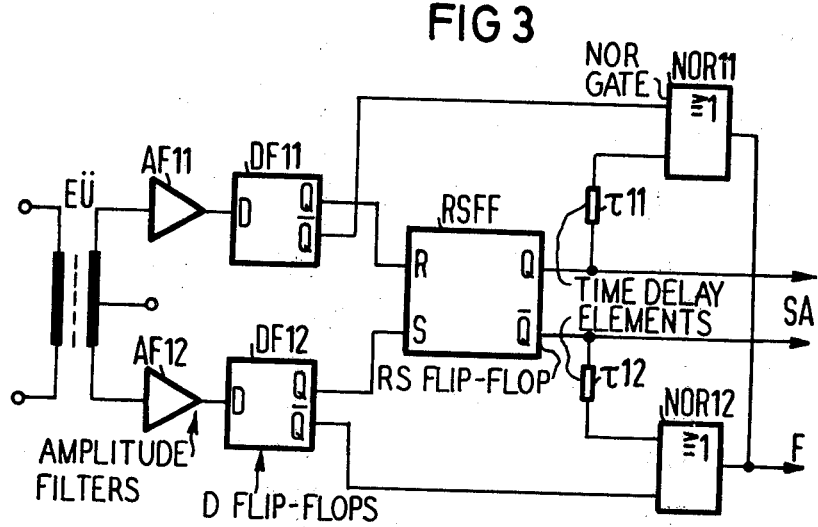
FIG. 3 is a schematic representation of a portion of a regenerator constructed in accordance with the present invention and having a modified input circuit.

FIG. 1 relates to that portion of a regenerator which is essential to the invention and which comprises the amplitude filters, required for the amplitude decision making process regarding the received pulses, and the D flip-flops which are normally used for time decision making. Not illustrated are the remote feed filters and the input-end distortion correcting arrangement required to correct the distortion of the cable frequency response. A distortion-corrected pseudo-ternary signal represented in bipolar form and in the AMI code is received at an input E. First and second amplitude filters AF1, AF2 split the bipolar signal into two unipolar pulse trains, and the first amplitude filter AF1 emits the pulse train which corresponds to the positive pulses of the input signal following amplitude decision making and amplitude regeneration to the D input of the first, following D flip-flop DF1. Similarly, the second amplitude filter AF2 emits a pulse train corresponding to the negative pulses of the input signal by level shifting, without rectification or inversion, in unipolar form to the D input of a second D flip-flop DF2. The decision thresholds in the amplitude filters are each here set at half the maximum amplitude of the input signal pulses. In the present example, the amplitude filters are constructed with emitter-coupled differential amplifiers. For very high transmission speeds, because of the limited amplification band width product of the active elements, it is advantageous to use amplitude filters which effect only an amplitude selective amplification of the level ranges which surround the thresholds, and, moreover, execute a level shift which matches the thresholds of the D flip-flops to the position required for the amplitude selectively amplified signal. The D flip-flops then undertake the function of the actual amplitude decision making.

The pulse inputs of the D flip-flops are connected to a source of a bit pulse train, although these connections and likewise the connections to an operating voltage source have not been illustrated in the drawing. In addition to the regenerator assemblies, the design of the actual code rule violation checking device comprises an RS flip-flop RSFF, a first time delay element $\tau 1$, a second time delay element $\tau 2$, a first NOR gate and a second NOR gate.

The reset input R of the RS flip-flop is connected to the non-inverting output Q of the first D flip-flop DF1, whereas the set input S of the RS flip-flop is connected to the inverting output $\overline{Q}$ of the second D flip-flop DF2. One input of the first NOR gate NOR1 is connected to the inverting output $\overline{Q}$ of the first D flip-flop, whereas the second input of the NOR gate NOR1 is connected to the non-inverting output Q of the RS flip-flop via the first time delay element $\tau 1$. The non-inverting output Q of the second D flip-flop is connected to one input of the second NOR gate NOR2 whose other input is connected via the second time delay element $\tau 2$ to the inverting output $\overline{Q}$ of the RS flip-flop. The outputs of the two NOR gates are connected to one another in the form of a wired OR gate and are connected to an output F for providing a fault signal, whereas the non-inverting and the inverting outputs of the RS flip-flop are also each connected to a terminal of an output SA for the output signal of the regenerator which occurs in the binary-difference code. This output represents a push-pull output, although the entire signal information occurs in unipolar form at each individual output terminal.

As regards the explanation of the mode of operation of the arrangement illustrated in FIG. 1, reference should be taken to FIG. 2 which indicates pulses occurring at individual measurement points of the arrangement in FIG. 1. Line E represents the distortion-corrected input signal which at a time F1 is superposed with a fault pulse. The output signals of the first D flip-flop DF1 are represented in the lines $Q_1$ and $\overline{Q_1}$, and similarly the output signals of the second D flip-flop DF2 are represented in the lines $\overline{Q_2}$ and $Q_2$. The duration of the pulses is to correspond to approximately one bit duration. It will be clear that the first D flip-flop is switched by the positive pulses of the input signal, whereas the second D flip-flop is switched by the negative pulses and that the fault pulses F1 which have been assumed, for example, to be a positive pulse, would lead to the switching of the first D flip-flop DF1.

If it is assumed that the RS flip-flop is initially set, the first positive pulse leads, via the Q output of the first D flip-flop DF1 (corresponding to the line $Q_1$ of FIG. 2) to the reset input of the RS flip-flop receiving a pulse which, approximately at the end of the positive input pulse, leads to the resetting of the RS flip-flop. A following negative input pulse leads, via an output signal at the Q output of the second D flip-flop DF2 (corresponding to the line $\overline{Q_2}$ of FIG. 2), to a pulse occurring at the set input S of the RS flip-flop RSFF which leads to the setting of the RS flip-flop RSFF again. The output signals of the RS flip-flop RSFF corresponding to the lines $Q_{RS}$ and $\overline{Q_{RS}}$ of FIG. 2 occur in the binary-difference code, and in the pulse diagram of FIG. 2 it has been assumed, for simplicity, that the signal transit time through the RS flip-flop RSFF corresponds to one bit duration so that in this case the time delay elements $\tau 1$ and $\tau 2$ are unnecessary. In practice, however, an RS flip-flop will be used whose signal ktransit time is shorter than one bit duration so that the signal form corresponding to the lines $Q_{RS}$ and $\overline{Q_{RS}}$ correspond to the bit pattern only at the output of the time delay elements.

The lines referenced NOR1 and NOR2 in FIG. 2 indicate the output signals of the two NOR gates in accordance with the logic link $\overline{Q1 \cup Q_{RS}}$ and $\overline{Q2 \cup \overline{Q_{RS}}}$ The positive fault pulse F1 in the input signal is fed via the first D flip-flop DF1 to the input of the first NOR gate NOR1 and produces a pulse at the NOR gate output as the RS flip-flop RSFF is already reset by the previous positive input pulse and, therefore, the logic zero level occurs at its Q output.

In the second fault situation, it will be assumed that a disturbance in the first D flip-flop or in the preceding amplitude filter occurs which leads to the switching of the first D flip-flop even in the event of negative input pulses. In this case, the fault pulse referenced F1 occurs at the outputs Q and $\overline{Q}$ of the first D flip-flop and can manifest in different ways. In this case, an input signal is present both at the set input S and the reset input R of the RS flip-flop RSFF so that it is dependent upon the time of arrival of the signals as to which signal is forwarded. If the reset pulse emanating from the disturbed D flip-flop is forwarded, finally the first NOR gate NOR1 emits a fault signal, whereas if the set pulse emanating from the second D flip-flop is forwarded, no fault signal is produced as, in fact, no transmission fault has occurred.

Finally, the case will be considered in which a temporary disturbance, for example via the current supply terminal, occurs in the second amplitude filter AF2 or in the second D flip-flop DF2. The output pulse of the second D flip-flop DF2, together with the output signal of the set RS flip-flop RSFF, produce a fault signal at the output of the second NOR gate NOR2. This indicates that the regenerator, together with the connected code rule violation checking device, recognizes not only those faults which are produced on the transmission link and which violate the code rules of the AMI code, but also those faults which are produced by faulty operation in the regenerator itself.

The amplitude filters which precede the D flip-flops can consist of differential amplifiers which, by the selection of the reference voltage, are set in such a manner that in the case of positive pulses one differential amplifier is switched over and in the case of negative pulses the other differential amplifier is switched over. Here, the negative pulses are not changed in phase. The German published application No. 24 07 954 also discloses an input circuit for a regenerator which, in accordance with FIG. 3, contains an input transformer EU with a center-tapped secondary winding. The outer terminals of the secondary winding are each connected to a differential amplifier as amplitude decision devices. In this input circuit, a rectifier effect occurs as a result of which the phase of the negative pulses is rotated by 180° in contrast to the previously-explained circuit. In comparision to the circuit arrangement illustrated in FIG. 1, in accordance with FIG. 3 it is merely necessary to modify the wiring of the outputs of the second D flip-flop DF12. The non-inverting output Q of the D flip-flop DF12 must then be connected to the set input S of the following RS flip-flop RSFF, whereas the inverting output of the D flip-flop DF12 must be connected to one of the inputs of the second OR gate NOR2.

Figure 4:
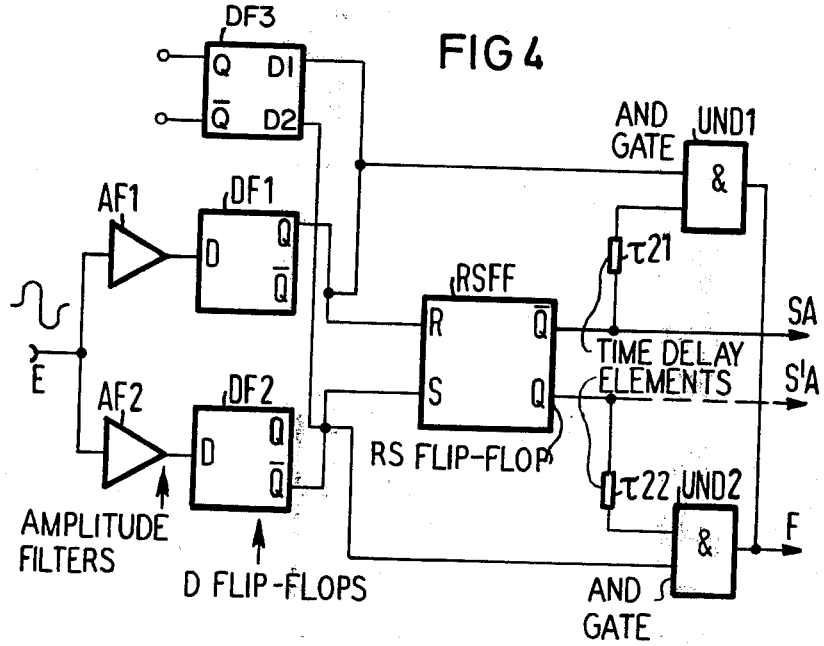
FIG. 4 is a schematic representation of a portion of a regenerator constructed in accordance with the invention and having a code rule violation checking device provided in positive logic.

On certain occasions it is desirable to construct the code rule violation checking device in the regenerator by using positive logic. For example, the integrated circuit which contains the pulsed D flip-flops and the RS flip-flop can also contain AND gates which are not required for the actual regenerator. In this case, it is advantageous to construct the regenerator using code rule violation checking devices corresponding to that illustrated in FIG. 4. FIG. 4 contains, at the input end, the two amplitude filters AF1 and AF2 which are connected in parallel at their inputs and which are followed by the first and second D flip-flops DF1 and DF2. In accordance with the regenerators illustrated in FIGS. 1 and 3, the non-inverting output Q of the first D flip-flop DF1 is connected to the reset input R of the RS flip-flop RSFF, whereas, in contrast to the regenerator illustrated in FIG. 3, the set input S of the RS flip-flop RSFF is connected to the inverting output $\overline{Q}$ of the second D flip-flop DF2. The use of a first AND gate UND1 and a second AND gate UND2 now permits the connection of the other outputs of the D flip-flops to be eliminated and permits one input of the second AND gate UND2 to be connected to the set input S of the RS flip-flop RSFF and therefore to the inverting output $\overline{Q}$ of the second D flip-flop DF2, whereas one input of the first AND gate UND1 can be connected to the reset input R of the RS flip-flop RSFF and therefore to the non-inverting output Q of the first D flip-flop DF1. The second input of the first AND gate is connected to the output $\overline{Q}$ of the RS flip-flop RSFF by way of a time delay element. $\tau 21$, whereas the second input of the second AND gate UND2 is connected by way of a further time delay element $\tau 22$ to the non-inverting output Q of the RS flip-flop RSFF. The outputs of the two AND gates are again directly connected to one another in accordance with the known "wired or" gate circuit. The signal outputs SA and S'A are also connected to the outputs $\overline{Q}$ and Q of the RS flip-flop RSFF. At these outputs, the regenerated signal occurs not in the transmission code but in the binary-difference code, and, therefore, when the regenerator illustrated in FIG. 4 is used as a link regenerator, a further recoding is necessary. This recoding of the regenerated signals in the AMI code can advantageously be carried out by means of a stub line in which appropriately displaced pulses are reversed polarity can be produced from the unipolar pulses at one of the two signal outputs of the RS flip-flop RSFF by reflections at the short-circuited end of the stub line and with a transit time corresponding to one bit duration of the pulses. Here, it is clear that an exchange of the reset input R and the set input S of the RS flip-flop RSFF merely leads to an exchange of the positive and negative pulses in the AMI signal produced by means of the stub line. If, on the other hand, the regenerator is used as a line terminal device, the binary-difference code must be recoded into the normal binary code. This recoding can be carried out in a simple manner by means of a further D flip-flop DF3 having two non-inverting inputs linked by the logical OR-function. Each of the inputs of this third D-flip-flop must be connected to a respective one of the inputs of the RS flip-flop. Then, the regenerated signal can be obtained in the original binary code, from the outputs of this further D flip-flop.

In order to safeguard the pulse symmetry in dynamic operation, an RS flip-flop is used whose time delay for the dropping of the output level from the maximum to the minimum value correponds to the time delay for the rise in the output level from the minimum value to the maximum value.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A regenerator for PCM signals represented in the AMI code, comprising:
   input means for receiving positive and negative input pulses; first and second D flip-flops each including a D input, a Q output and a $\overline{Q}$ output;
   means connecting said input means to said D inputs of said first and second D flip-flops and operable to provide the positive input pulses to said first D flip-flop and negative input pulses to said second D flip-flops to cause said D flip-flops to produce respective pulses;
   an RS flip-flop including a Q output, a $\overline{Q}$ output and a set input and a reset input respectively connected to selected outputs of said D flip-flops and operable in response to pulses produced by said D flip-flops to regenerate the input signals supplied thereto via said first and second D flip-flops as respective unipolar pulse trains at said Q and $\overline{Q}$ outputs of said RS flip-flop, each unipolar pulse train containing the entire information received from the input pulses, the pulses of said pulse trains having a predetermined bit duration; and first and second gate circuits each including two inputs and an output, said outputs of said first and second gate circuits connected together as a wired OR gate for providing fault signals, a first input of each gate circuit connected to a respective output of said RS flip-flop and a second input of each gate circuit connected to a selected output of a respective D flip-flop.

2. The regenerator of claim 1, and further comprising: first and second time delay elements connected between respective outputs of said RS flip-flop and the respective inputs of said gate circuits, and effective to provide pulse transit times through said RS flip-flop and said delay elements corresponding to a total of one bit duration.

3. The regenerator of claim 2, wherein: said first and second gate circuits are NOR gates;
   said first input of said first NOR gate is connected to said $\overline{Q}$ output of said first D flip-flop;
   said first input of said second NOR gate is connected to the non-inverting output Q of said second D flip-flop;
   said reset input R of said RS flip-flop is connected to said non-inverting output Q of said first D flip-flop;
   said set input S of said RS flip-flop is connected to the inverting output $\overline{Q}$ of said second D flip-flop;
   said second input of said first NOR gate is connected via said first time delay element to the non-inverting output Q of said RS flip-flop; and
   said second input of said second NOR gate is connected via said second time delay element to the inverting output $\overline{Q}$ of said RS flip-flop.

4. The regenerator of claim 2, wherein:
   said first and second gates are AND gates;
   said first input of said first AND gate is connected to said reset input R of said RS flip-flop and said output Q of said first D flip-flop;
   said second input of said first AND gate is connected to said inverting output Q of said RS flip-flop;
   said first input of said second AND gate is connected to said set input S of said RS flip-flop and to said output Q of said second D flip-flop; and
   said second input of said second AND gate is connected to said the non-inverting output Q of said RS flip-flop.

5. The regenerator of claim 2, wherein:
   said input means comprises an input transformer including a center-tapped secondary winding having outer terminals and differential amplifiers connected to said outer terminals as amplitude decision devices, said amplitude decision devices connected to said D inputs of said D flip-flops;
   said non-inverting output Q of said first D flip-flop is connected to said reset input R of said RS flip-flop;
   said non-inverting output Q of said second D flip-flop is connected to said set input S of said RS flip-flop; and
   said inverting outputs Q of said two D flip-flops are respectively connected to inputs of said gate circuits.

6. The regenerator of claim 5, wherein said gate circuits are each NOR gates.

7. The regenerator of claim 2, wherein: said RS flip-flop comprises a time delay for the drop of the output level from the maximum to the minimum value which corresponds to the time delay for the rise of the output level from the minimum to the maximum value, and a signal transit time therethrough which is substantially shorter than one bit duration.

8. The regenerator of claim 1, and further comprising:
   a third D flip-flop having two non-inverting inputs linked by the logical OR-function, a non-inverting output and an inverting output, each of said inputs connected to one of the inputs of said RS flip-flop.

* * * * *